US 6,655,703 B1

(12) United States Patent
Spears, Jr.

(10) Patent No.: US 6,655,703 B1
(45) Date of Patent: Dec. 2, 2003

(54) COMBINATION STEERING WHEEL AND BRAKE OPERATOR

(76) Inventor: Thomas P. Spears, Jr., 615 Mesa Valley Dr., Grand Junction, CO (US) 81504

( * ) Notice: Subject to any disclaimer, the term of this patent is extended or adjusted under 35 U.S.C. 154(b) by 137 days.

(21) Appl. No.: 10/040,725

(22) Filed: Dec. 28, 2001

Related U.S. Application Data

(60) Provisional application No. 60/259,581, filed on Jan. 2, 2001.

(51) Int. Cl.$^7$ ................................................ B62D 1/00
(52) U.S. Cl. .......................... 280/88; 180/333; 74/484
(58) Field of Search .......................... 180/333; 280/88, 280/771, 775, 778, 779; 74/484

(56) References Cited

U.S. PATENT DOCUMENTS

| | | | |
|---|---|---|---|
| 786,772 A | | 4/1905 | Lonn |
| 1,519,172 A | | 12/1924 | Stewart |
| 1,841,294 A | | 1/1932 | Nicholson |
| 2,223,800 A | | 12/1940 | Fines |
| 2,470,273 A | | 5/1949 | Von Uffel |
| 2,471,244 A | | 5/1949 | Self |
| 4,078,628 A | | 3/1978 | Reichenberger |
| 4,603,752 A | * | 8/1986 | Chambers et al. ........... 180/6.4 |
| 5,666,857 A | | 9/1997 | Sebazco |
| 6,167,775 B1 | * | 1/2001 | Sebazco ...................... 74/486 |
| 6,263,753 B1 | * | 7/2001 | Froehlich ..................... 74/482 |
| 6,446,992 B2 | * | 9/2002 | Sebazco ...................... 280/88 |

* cited by examiner

*Primary Examiner*—Paul N. Dickson
*Assistant Examiner*—Toan C To
(74) *Attorney, Agent, or Firm*—Akin Gump Strauss Hauer & Feld, L.L.P.

(57) ABSTRACT

A steering wheel for steering and braking an vehicle having a steering and braking system. A first steering wheel segment is spaced from and rotatably fixed to the hub. A second steering wheel segment is spaced from and rotatably fixed to the hub such that the second steering wheel segment is rotatable, in combination with the hub, about the steering axis to steer the vehicle. The second steering wheel segment is pivotably movable between an equilibrium position in which the second steering wheel segment is aligned with the first steering wheel segment to define at least a part of a steering wheel perimeter and a braking position. Wherein the second steering wheel segment is displaced from alignment from the first steering wheel segment to actuate the braking system so that the steering wheel can simultaneously steer and brake the vehicle.

10 Claims, 7 Drawing Sheets

COMBINATION STEERING WHEEL AND BRAKE OPERATOR

CROSS-REFERENCE TO RELATED APPLICATIONS

This application is a non-provisional of U.S. Provisional Application No. 60/259,581, filed Jan. 2, 2001, of which application is entitled to priority under 35 U.S.C. §119(e).

BACKGROUND OF THE INVENTION

The present invention relates to a steering and braking control system and, more particularly, to a steering wheel capable of simultaneously steering and braking a vehicle.

Conventional automobiles are not operable by some handicapped individuals. For example, a paraplegic may suffer paralysis of the lower half of his or her body that prevents the operation of a typical automobile. Although the paraplegic may be lacking in control of his or her lower body, the paraplegic may have suitable upper body strength, to operate controls which can be accessed using one's arms.

In addition to the desires of handicapped individuals, a non-handicapped person may also desire a control system that does not require the use of his/her legs, especially, if it allows for a system that more readily controls the automobile. This enhanced control system is particularly suited for racing cars or even in less vigorous recreation endeavors, such as in the use of off road vehicles.

BRIEF SUMMARY OF THE INVENTION

Briefly speaking, the invention is directed to a steering wheel for steering and braking an vehicle having a steering and braking system. The steering wheel is rotatably mountable about a steering axis in the vehicle. The steering wheel includes a hub rotatably positionable on the steering axis in operative engagement with the steering system. A first steering wheel segment is spaced from and rotatably fixed to the hub such that the first steering wheel segment is rotatable, in combination with the hub, about the steering axis to steer the vehicle. A second steering wheel segment is spaced from and rotatably fixed to the hub such that the second steering wheel segment is rotatable, in combination with the hub, about the steering axis to steer the vehicle. The second steering wheel segment is also pivotally connected to the hub such that the second steering wheel segment can move generally toward the steering axis. The second steering wheel segment is pivotally movable between an equilibrium position in which the second steering wheel segment is aligned with the first steering wheel segment to define at least a part of a steering wheel perimeter and a braking position. Wherein the second steering wheel segment is displaced from alignment from the first steering wheel segment to actuate the braking system so that the steering wheel can simultaneously steer and brake the vehicle.

The present invention is alternatively directed to an apparatus for steering and braking an vehicle having a steering and braking system including a steering column disposed in the vehicle and positioned along a steering axis. A steering wheel is disposed on the steering column. The steering wheel includes a hub disposed on the steering column in operative engagement with the steering system. A first steering wheel segment is spaced from and rotatably fixed to the hub such that the first steering wheel segment is rotatable, in combination with the hub, about the steering axis to steer the vehicle. A second steering wheel segment is spaced from and rotatably fixed to the hub such that the second steering segment is rotatable, in combination with the hub, about the steering axis to steer the vehicle. The second steering wheel segment is also pivotally connected to the hub such that the second steering wheel segment can move generally toward the steering axis. The second steering wheel segment is pivotally movable between an equilibrium position in which the second steering wheel segment is aligned with the first steering wheel segment to define at least part of a steering perimeter and a braking position. Wherein the second steering wheel segment is displaced in alignment with the first steering wheel segment to actuate the braking system so that the steering wheel can simultaneously steer and brake the vehicle. At least one cable extends through at least a portion of the steering column and extends at least partially between the braking system and the second steering wheel segment so that the second steering wheel segment is in operative communication with the braking system.

BRIEF DESCRIPTION OF THE SEVERAL VIEWS OF THE DRAWINGS

The foregoing summary, as well as the following detailed description of preferred embodiment of the invention, will be better understood when read in conjunction with the appended drawings. For the purpose of illustrating the invention, there is shown in the drawings an embodiment which is presently preferred. It is understood, however, that the invention is not limited to the precise arrangement and instrumentality shown. In the drawings.

DETAILED DESCRIPTION OF THE INVENTION

Figure 1:
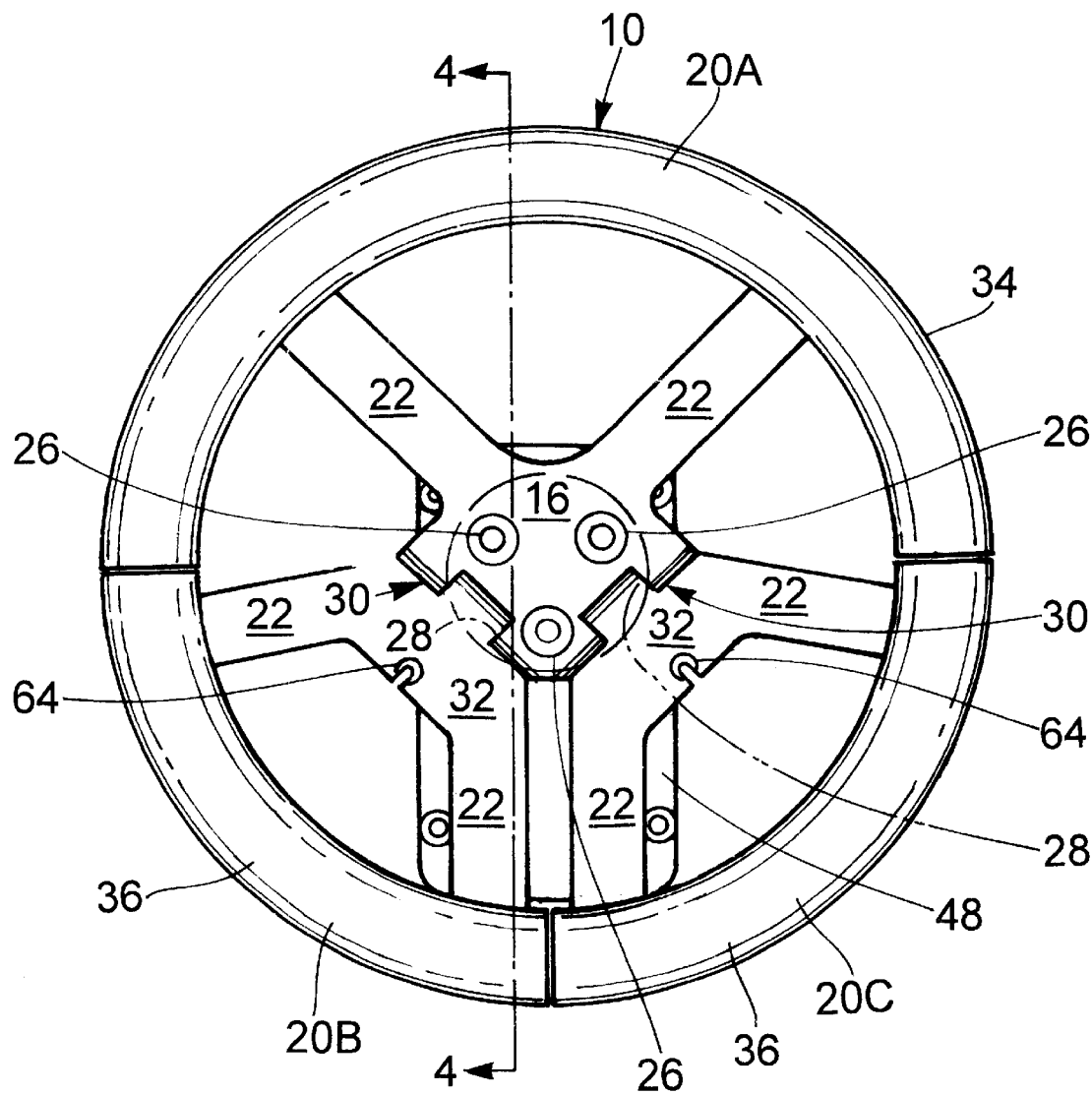
FIG. 1 is a front elevational view of a steering wheel according to the preferred embodiment of the invention.

Certain terminology is used in the following description for convenience only and is not limiting. The words "right," "left," "lower" and "upper" designate directions in the drawings to which reference is made. The words "inwardly" and "outwardly" refer to directions toward and away from, respectively, the geometric center of the steering wheel and designated parts thereof. The term "vehicle," as used in the specification and in the claims, means "any one of a car, automobile, bus, truck, riding lawn mower, or the like. " The terminology includes the words above specifically mentioned, derivatives thereof and words of similar import.

Additionally, the word "a," as used in the claims and in corresponding portions of the specification, means "at least one."

Referring to the drawings in detail, wherein like numerals refer to like elements throughout, FIGS. 1–9 illustrate a preferred embodiment of a steering wheel according to the preferred embodiment of the present invention, generally designated as 10. Briefly speaking, the steering wheel is rotatably mounted about a steering axis "X" in the vehicle. The steering wheel 10 is for steering and braking an vehicle having a steering and braking system. In the preferred embodiment, the steering wheel 10 is secured to a steering column 18 that is rotated with the steering wheel.

Figure 5:
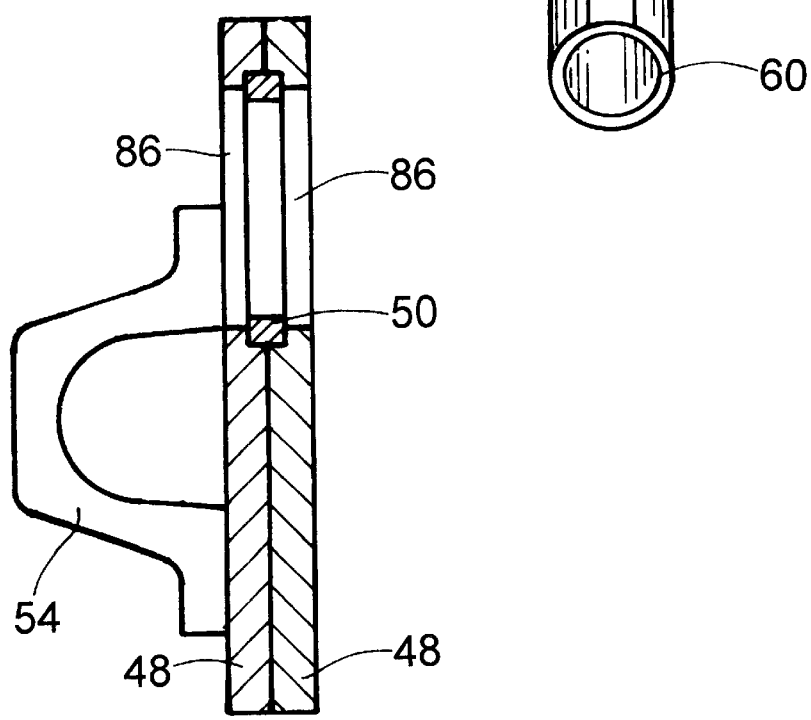
FIG. 5 is a cross-sectional view of support plates, a bearing, and saddle clamps which are preferably used to mount the combination steering column and steering wheel in a vehicle.
Figure 9:
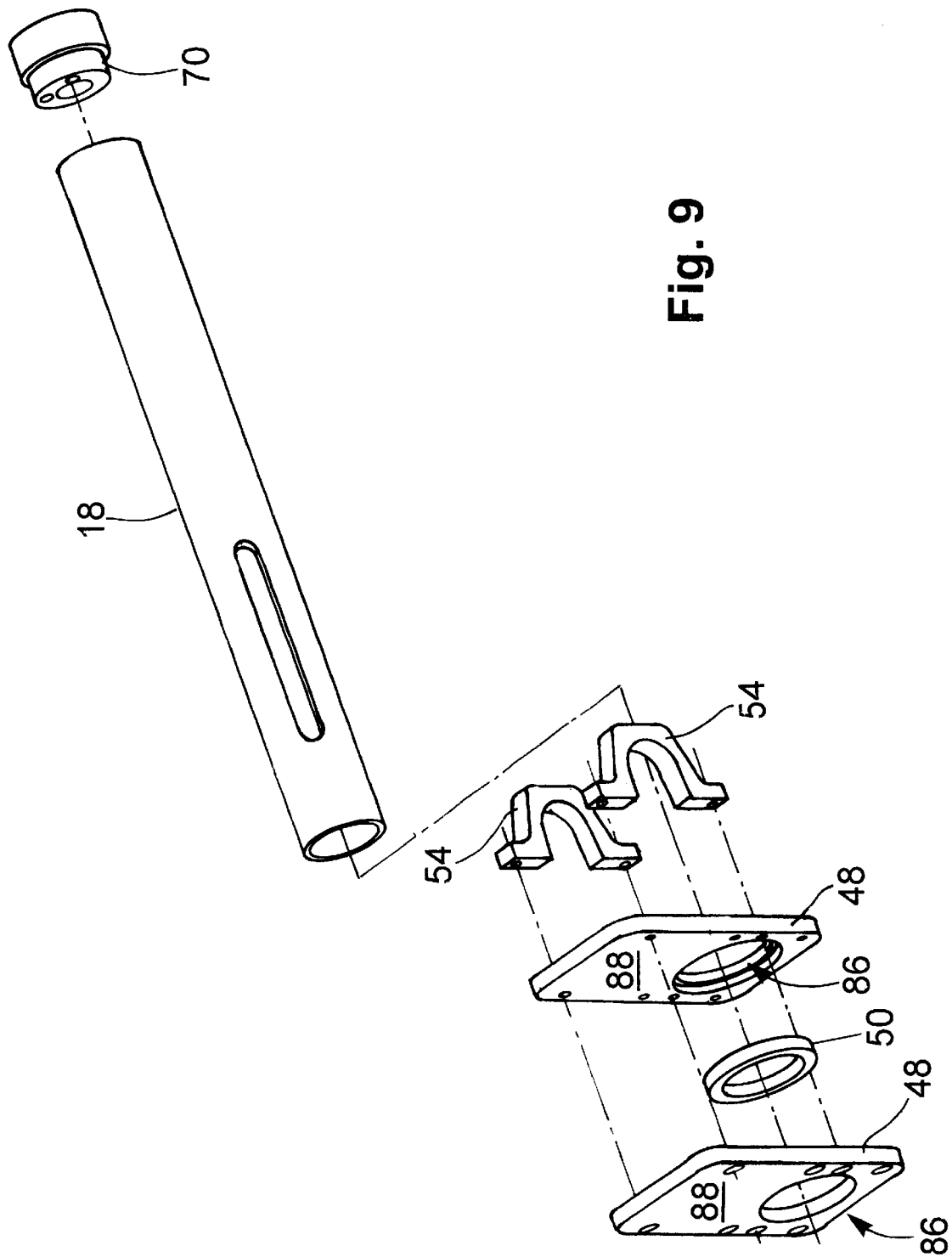
FIG. 9 is an exploded view of the steering column, the support plates, the bearing, and the saddle clamps.

Referring to FIGS. 5 and 9, the end of the steering column 18 proximate to the steering wheel 10 is preferably secured to an vehicle using support plates 48. Each of the support plates 48 is preferably rectangularly shaped with a steering column bore 86 extending therethrough. The steering column bore 86 is used to properly align the steering column 18 relative to the vehicle. The support plates 48 provide a surface 88 for securing the steering assembly to the vehicle.

Sandwiched within the support plates 48 and aligned with the bores 86 is a bearing 50 to facilitate the rotation of the steering column 18 within the steering column bores 86. The bearing 50 is preferably, but not necessarily, formed of nylon. Each of the steering column bores 86 preferably has a shoulder positioned around a portion of the corresponding bore 86 to allow the bearing 50 to be inserted into a portion of each support plate 48. The support plates 48 include saddle clamps 54 which can be attached over a beam or roll bar (not shown) of an vehicle to secure the steering column 18 in position.

Unless otherwise stated, it is preferable that the steering wheel 10, as well as its various components, is formed from a relatively hard and durable material, such as 6061 T6 aluminum. Those of ordinary skill in the art will appreciate from the present disclosure that other materials, such as other varieties of aluminum, brass, alloys, stainless steel, steel, a polymeric material or the like can be used to form various components of the steering wheel 10 without departing from the present invention.

The steering wheel 10 of the present invention is not limited to use with any particular type of steering system and/or braking system. The preferred method for mounting the steering wheel 10 positions the steering wheel 10 in parallel with the existing braking system of an vehicle. Various braking systems are described in detail in U.S. Pat. Nos. 786,772; 1,519,172; 1,841,294; 2,223,800; 2,470,273; 2,471,244; 4,078,628; and 5,666,857, each of which is hereby incorporated by reference herein in its entirety.

Referring to FIG. 1, the steering wheel 10 preferably includes a central hub 16 that is rotatably positionable along the steering axis "X" and in operative engagement with the steering system of an vehicle. The hub 16 preferably has a generally square shape and is preferably rotatable with the steering column 18 that is disposed in the vehicle and is positioned along the steering axis "X." While it is preferred that the steering wheel 10 be rotatable with the steering column 18 of the present invention, those of ordinary skill in the art will appreciate from this disclosure that the steering column can be rotatably fixed without departing from the scope of the present invention. The steering wheel 10 is preferably mounted on the steering column 18 via a cap 24.

Referring to FIG. 1, it can be seen that the steering wheel 10 is preferably separable into three segments. The first steering segment 20A of the steering wheel 10 is spaced from and rotatably fixed to the hub 16 such that the first steering wheel segment 20A is rotatable, in combination with the hub 16, about the steering axis "X" to steer the vehicle. The fist, second (further described below), and third (further described below) steering wheel segments 20A–20C are each supported by at least one spoke 22 extending radially outwardly from the hub 16. The first steering wheel segment 20A is preferably supported by two spaced apart spokes 22. The first steering wheel segment 20A preferably forms an arc of a circle extending through approximately one hundred eighty (180°) degrees. However, those of ordinary skill in the art will appreciate from this disclosure that the degrees of arc through which the first steering wheel segment 20A extends can be varied from between about thirty (30°) degrees and about three hundred forty (340°) degrees without departing from the scope of the present invention.

The two spokes 22 supporting the first steering wheel segment 20A extend from the hub 16. The hub 16 preferably has a generally square shape and is fixed to a motion limiting plate 52 (further described below) and a cap 24 via axially extending fasteners 26.

A second steering wheel segment 20B is spaced from and rotatably fixed to the hub 16 such that the second steering wheel segment 20B is rotatable in combination with the hub about the steering axis "X" to steer the vehicle. The second steering wheel segment 20B is preferably pivotally connected to the hub 16 via two spaced apart spokes 22. The two spokes 22 preferably extend from a side plate 32 which is hingedly connected to the hub 16. The second steering wheel segment 20B is preferably pivotally mounted to the hub 16 via a pin 28. The pin 28 extends through the hinge connection 30 between the hub 16 and the side plate 32. The pins 28 and hinge connections 30 are preferably, but not necessarily, formed of titanium. A brass busing is preferably disposed about the pins 28.

Figure 4:
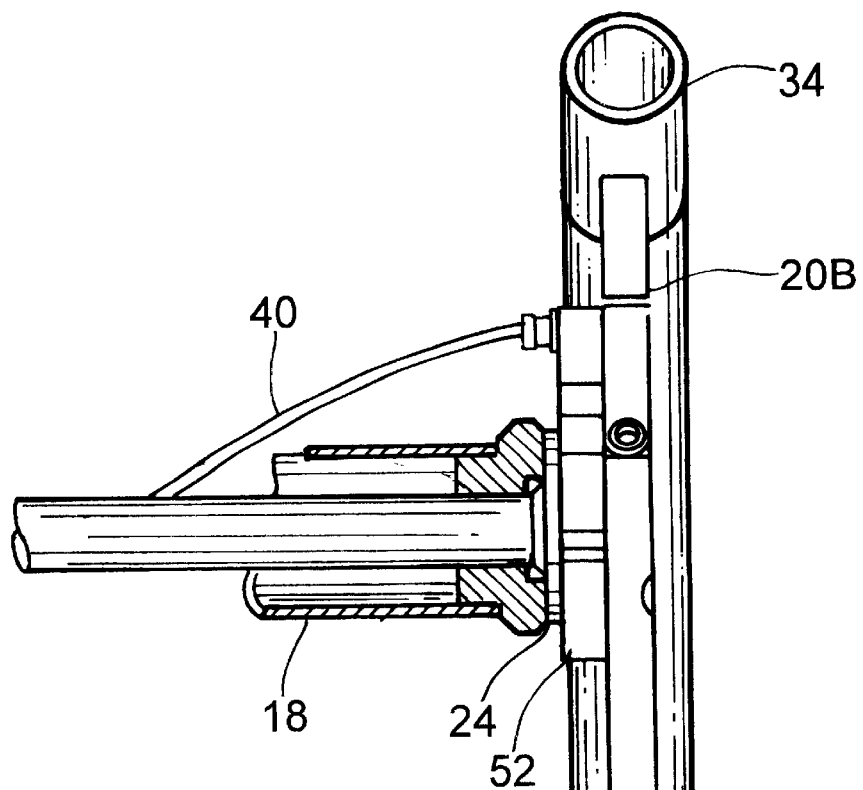
FIG. 4 is a cross-sectional view of the steering wheel of FIG. 1 as taken along the line 4—4 of FIG. 1.

The second steering wheel segment 20B preferably forms an arc of a circle extending through approximately ninety (90°) degrees. Referring to FIG. 4, the second steering wheel segment 20B preferably has a generally rounded shape 60 that preferably complements the first steering wheel segment 20A. The use of the hinge connection 30 between the side plate 32 and the hub 16 results in the second steering wheel segment 20B being rotatable, in combination with the hub 16 and the other steering wheel segments 20A, 20C, about the steering axis "X."

Figure 3:
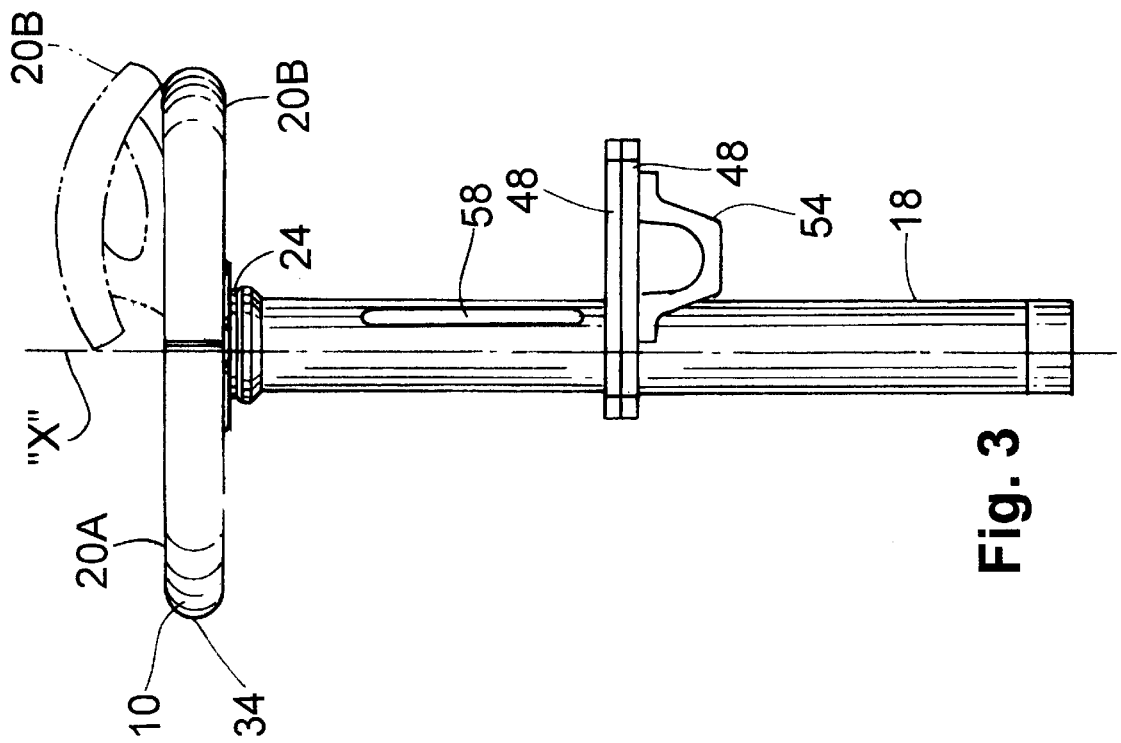
FIG. 3 is a left side elevational view of the combination steering wheel and steering column of FIG. 2.
Figure 2:
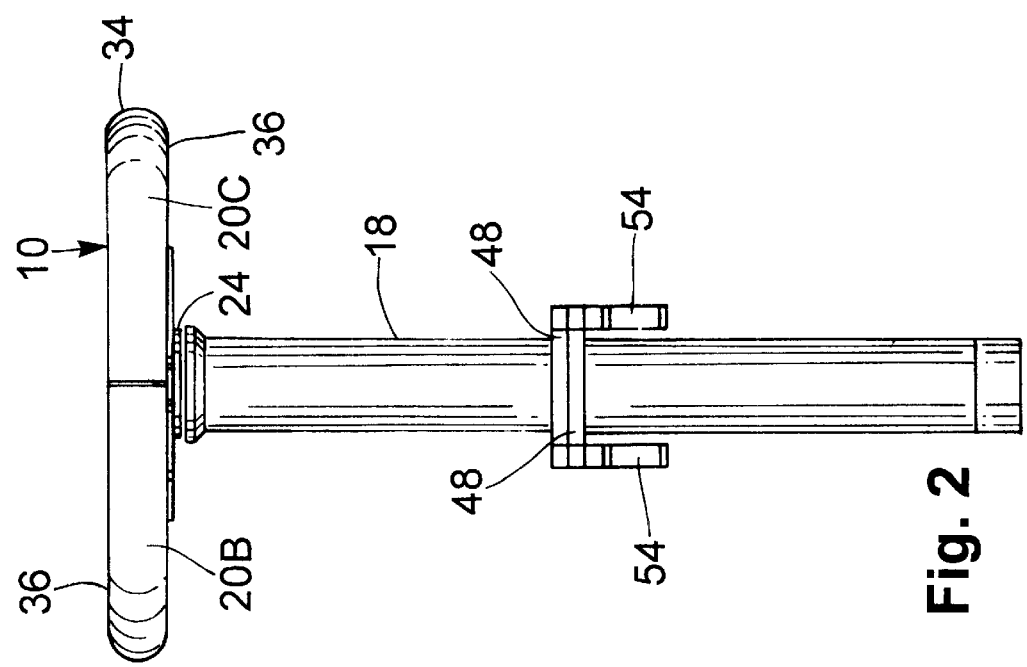
FIG. 2 is a bottom plan view of the steering wheel of FIG. 1 mounted on a steering column.

Referring to FIG. 3, the second steering wheel segment 20B is preferably pivotably connected to the hub 16 such that the second steering wheel segment 20B can move generally toward the steering axis "X." Referring to FIG. 1, the use of the hinge connection 30 preferably allows the second steering wheel segment 20B to be pivoted out of the plane of the steering wheel (i.e., pivoted out of the paper as viewed in FIG. 1). Those of ordinary skill in the art will appreciate from this disclosure that the second and third steering wheel segments 20B, 20C can be pivotable toward the steering column 18 without departing from the scope of the present invention. Referring to FIG. 3, the steering wheel 10 can be mounted to an vehicle so as to be pivotable generally leftwardly without departing from the scope of the present invention.

The second steering wheel segment 20B is pivotably movable between an equilibrium position (shown in FIGS. 1–3 in solid lines) in which the second steering wheel segment 20B is aligned with the first steering wheel segment 20A to define at least a part of the steering wheel perimeter 34 and a braking position 38 (shown in phantom lines in FIG. 3) wherein the second steering wheel segment 20B is displaced from alignment with the first steering wheel segment 20A to actuate the braking system so that the steering wheel 10 can simultaneously steer and brake the vehicle.

Referring to FIG. 1, it is preferable, but not necessary, that the steering wheel 10 include a third steering wheel segment 20C. The third steering wheel segment 20C is preferably spaced from and rotatably fixed to the hub 16 such that the third steering wheel segment 20C is rotatable, in combination with the hub 16, about the steering wheel axis "X" to steer the vehicle. The third steering wheel segment 20C is supported by two spokes 22 that extend from a side plate 32 radially outwardly to the third steering wheel segment 20C. The third steering wheel segment 20C forms an arc of a circle extending through approximately ninety (900) degrees. Those of ordinary skill in the art will appreciate that the number of degrees of arc through which the third steering wheel segment 20C extends can be varied without departing from the scope of the present invention. Similarly, it is not necessary for the third steering wheel segment 20C to be symmetric with the steering wheel 20B. The side plate 32 of the third steering wheel segment 20C is attached to the hub 16 via a pin 28. The pin 28 extends through a hinge connection 30 between the side plate 32 and the hub 16. The hinge connection 30 allows the third steering wheel segment 20C to rotate, in combination with the hub, laterally about the steering axis "X." The third steering segment 20C is also pivotally connected to the hub such that the third steering wheel segment 20C can move generally toward the steering axis "X." The hinge connection 30 allows the third steering wheel segment 20C to be rotated into and out of the page (as viewed in FIG. 1). The third steering wheel segment 20C is pivotably moveable between an equilibrium position (shown in FIGS. 1–3) in which the third steering wheel segment 20C is aligned with the first steering wheel segment 20A to define at least part of the steering wheel perimeter 34 and a braking position (similar to the braking position shown for the second steering wheel segment 20B in FIG. 3) wherein the third steering wheel segment 20C is displaced from alignment with the first steering wheel segment 20A to actuate the braking system.

Referring to FIG. 1, it is preferable, but not necessary, that the first, second and third steering wheel segments 20A–20C define a steering wheel perimeter 34 which has a generally cicular shape. However, those of ordinary skill in the art will appreciate from this disclosure that the first through third steering wheel segments 20A–20C form other shapes or have a discontinuous perimeter without departing from the scope of the present invention.

Figure 6:
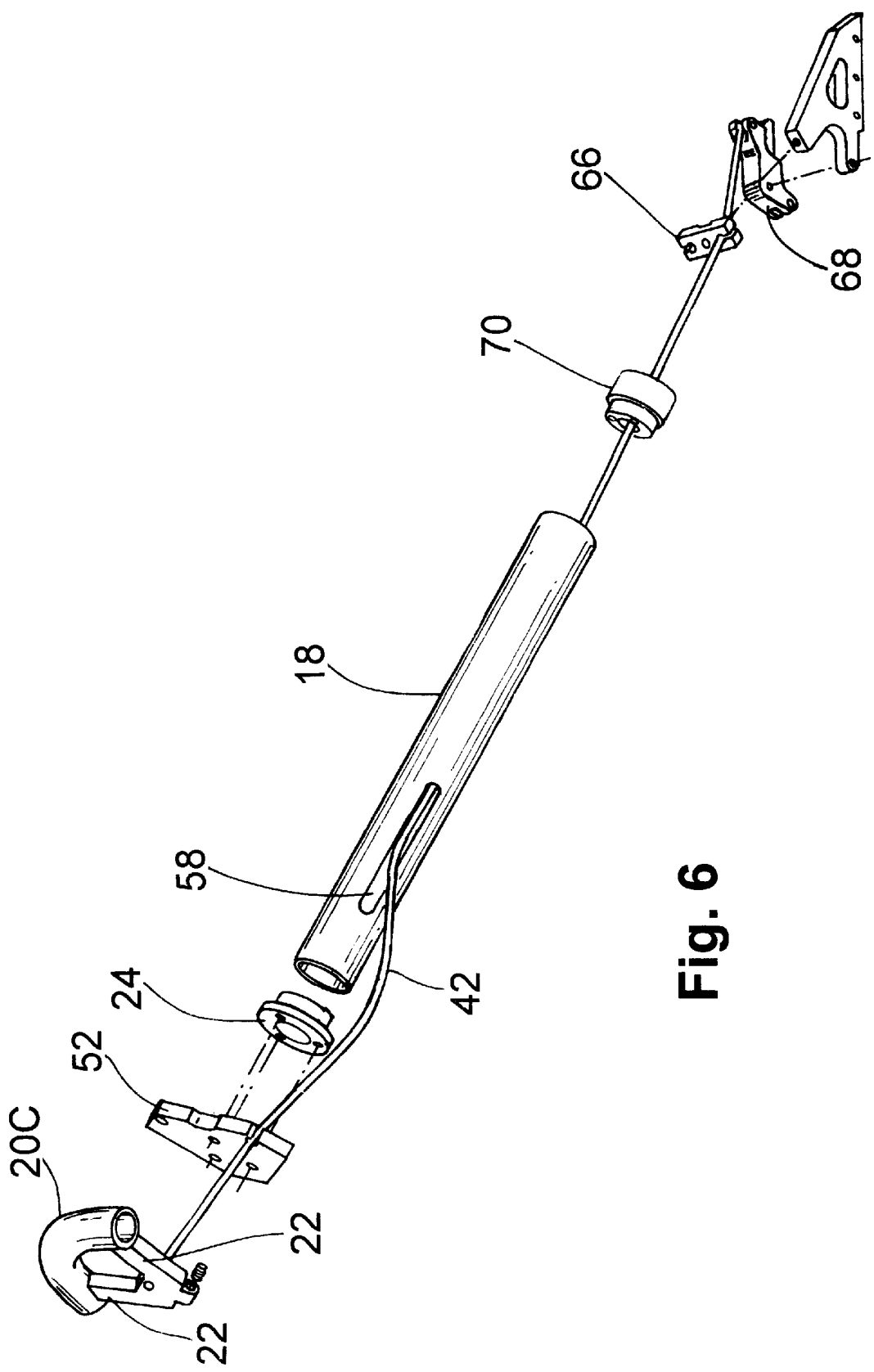
FIG. 6 is a partial exploded view of the combination steering wheel and steering column illustrating at least one cable, a cable stop, a cantilever member, and a cable T-mount.

Referring to FIG. 4, it is preferable that at least one cable 40 extend through the steering column 18 between the braking system and the second steering wheel segment 20B so that the second steering segment 20B is in operative communication with the braking system. Referring to FIG. 6, It is preferable, but not necessary, that at least another cable 42 extend through the steering column 18 between the braking system and the third steering wheel segment 20C so that the third steering wheel segment 20C is in operative commination with the braking system. The at least one cable 40 and at least another cable 42 are preferably formed of a strong, corrosion resistant, durable material such as steel or the like. It is preferred but not necessary that the cables 40, 42 each include at least one strand that is enclosed in a coaxial jacket. As described below, the at least one strand is displacable within the coaxial jacket without changing the positioning of the coaxial jacket in a manner well known in the art.

Referring to FIGS. 5 and 6, the steering wheel 10 is preferably mounted onto a cap 24 with a motion limiting plate interposed between the two components. The cap 24 is preferably formed of steel. The motion limiting plate 52 prevents the second and third steering wheel segments 20B, 20C from being displaced toward the steering column 18. As described below, the combination of the motion limiting plate 52 and the hydraulics enclosed in a pump housing 56 results in the second and third steering wheel segments 20B, 20C having an equilibrium position.

The ends of the cables 40, 42 which connect to the second and third steering wheel segments 20B, 20C each have a ball (not shown) fitted on an end which is disposed within a groove in the respective steering segment 20B, 20C. The portions of the cables 40, 42 which extend between the second and third steering wheel segments and opening in the motion limiting plate 52 are preferably limited to the at least one strand of each cable. The coaxial jacket of the cables 40, 42 preferably extends between the motion limiting plate 52 and a cable stop 66 (further described below). The portion of the cables 40, 42 which extend between the cable stop 66 and a cantilever member 68 if preferably limited to the strands. Thus, movement of the second and third steering wheel segments 20 toward the steering axis "X" causes the strands within the cables 40, 42 to be pulled away from the steering column which results in displacing the cantilever members 68. As further described below, when the cantilever members 68 are actuated, hydraulics in the pump housing 56 activate the braking system of the vehicle.

Figure 7:
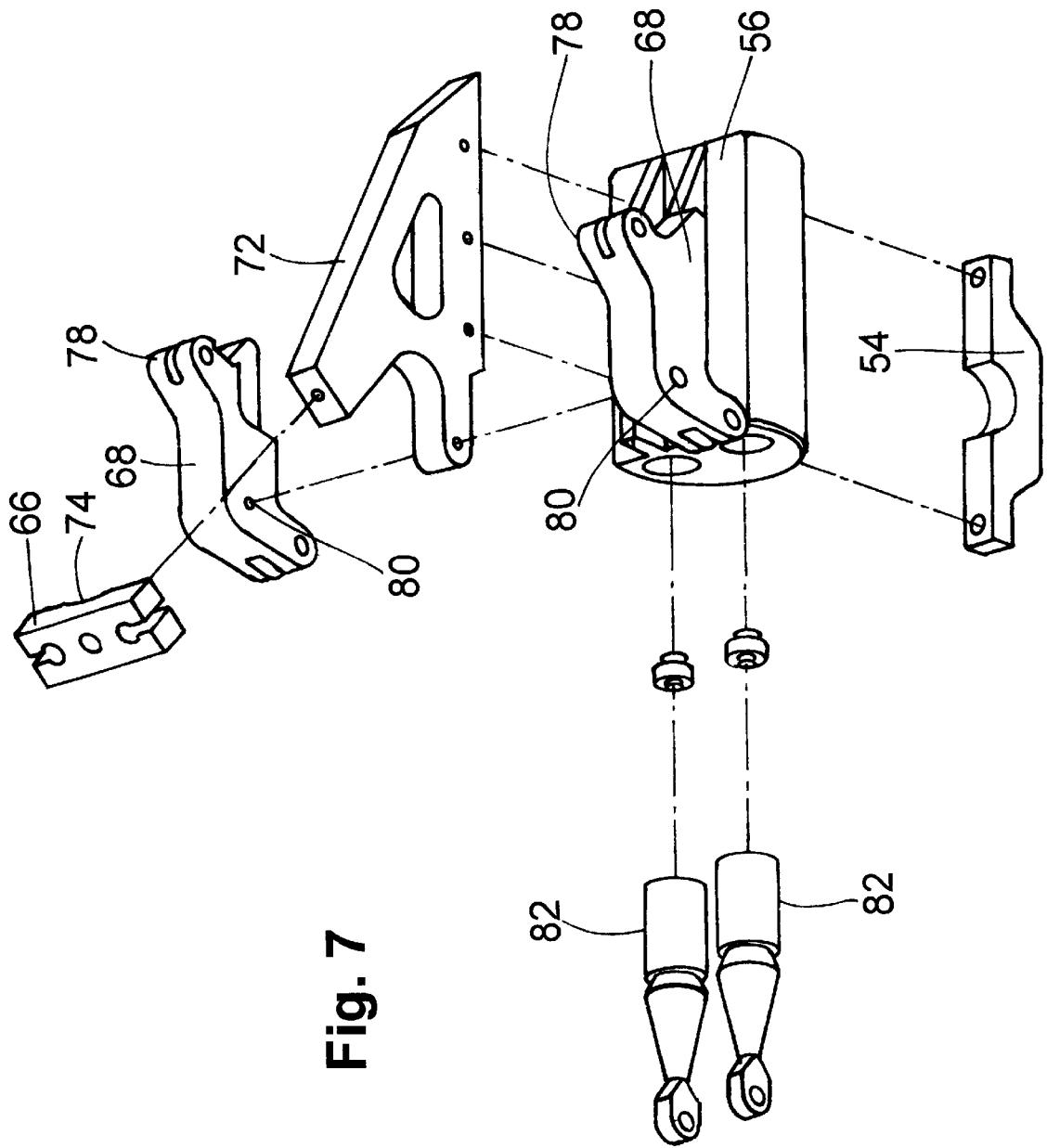
FIG. 7 is an exploded view of a pump housing for use with the steering wheel of FIG. 1.
Figure 8:
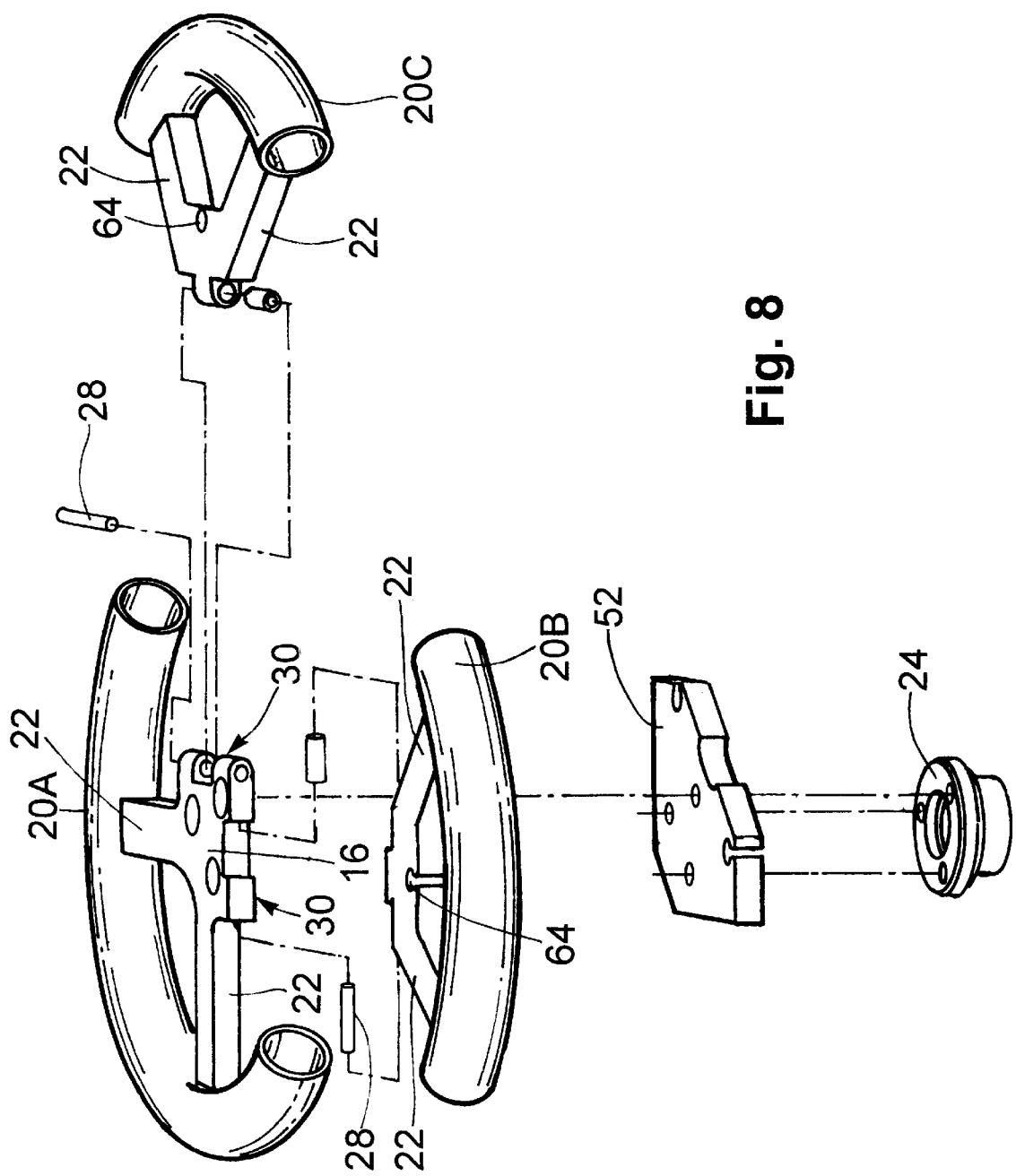
FIG. 8 is an exploded view of the steering wheel of FIG. 1, a motion limiting plate, and a hub.

Referring to FIG. 7, the cable stop 66 preferably has a generally rectangular shape with a groove 74 positioned along a bottom side. The cable stop 66 preferably has a separate cable bore 76 for securing the coaxial jacket of each cable 40, 42. A mounting bore 78 is preferably positioned through the cable stop 66 to allow the cable stop 66 to be mounted onto a cable mount 72. The cable stop is preferably fixed to the pump housing 56 via the cable mount 72. The cable mount 72 preferably has a generally triangular shape and is sized so as to space the cable stop 66 an appropriate distance from the bore 78 of the cantilever members 68 that receive the cables 70, 72. The spacing of the cable stop 66 from the first end of each cantilever members 68 allows the necessary rotation of the cantilever members 68 about their pivot points 80 to compress pistons 82 and activate the braking system of the vehicle which has its braking system attached to the pump housing 56. Each cantilever member 68 has a second end 84 that is preferably attached to a rod end of a piston 82.

The cables 40, 42 each preferably extend from the respective steering wheel segment 20B, 20C; through the motion limiting plate 52; along the outside of a portion of the steering column 18; through one of two opposing slots 58 into the steering column; through the remainder of the steering column 18; through a collar 70 disposed proximate an end of the steering column 18 opposite from the steering wheel 10; through the cable stop 66; and to the respective cantilever member 68. Referring to FIG. 7, while it is preferred that the cantilever members 68 activate a hydraulic system, those of ordinary skill in the art will appreciate from this disclosure that the cantilever members 68 can be used to activate servo motors (not shown) via buttons (not shown) or the like without departing from the scope of the present invention. The present invention does not require that the pump housing 56 be linearly aligned with the steering column 18 to properly function. Thus, the design of the various linkages allows the steering wheel 10 to be installed into a variety of vehicles.

It is preferable that the cable mount 72 be mounted to the pump housing 56 and that each cantilever members 68 be pivotally mounted to a portion of the cable mount 72. A saddle clamp 54 is preferable used with the pump housing 56 to simplify the mounting and positioning of the pump housing 56 within the vehicle.

Referring to FIGS. 1–9 the steering wheel 10 of the present invention operates as follows. The steering wheel 10 can be rotated about the steering axis "X" to steer the vehicle while simultaneously braking the vehicle by displacing one of the second and third steering wheel segments 20B, 20C. When one of the steering wheel segments 20B, 20C is displaced, the respective cable 40, 42 is pulled away from the steering column 18 which results in displacing the appropriate strand. When the strand is displaced, one of the cantilever members 68 is caused to rotate which forces a piston 82 to move into the pump housing and thereby create hydraulic pressure within the pump housing 56. The pressure within the pump housing 56 activates the vehicle's brake system. When a displaced steering wheel segment 20B, 20C is released, the pressure within the pump housing 56 is reduced to cause the respective steering wheel segment 20B, 20C to move into abutment with the motion limiting plate 52 and back into the equilibrium position. It is preferable, but not necessary, that the second steering wheel segment 20B and the third steering wheel segment 20C are each biased into the equilibrium position 36 in alignment with the first steering wheel segment 20A. It is preferable, but not necessary, that the second steering wheel segment 20B is capable of actuating a left wheel brake and the third steering wheel segment 20C is capable of actuating a right wheel brake.

While it is preferred that the second and third steering wheel segments 20B, 20C be used to operate the brakes of an vehicle, one of ordinary skill in the art will appreciate from this disclosure that various other systems within the vehicle could be operated using the second and third steering wheel segments 20B, 20C. For example the steering wheel segments 20B, 20C could be used to operate a throttle or to control a retractable roof or sunroof or the like.

It will be appreciated by those skilled in the art that changes could be made to the embodiments described above without departing from the broad inventive concept thereof. Accordingly, those of ordinary skill-in the art will appreciate from this disclosure that the steering wheel of the present invention can use one, three, four or more hingedly attached steering wheel segments without departing from the scope of the present invention. Additionally, the shape of the perimeter 34 of the steering wheel can be non circular or discontinuous without departing from the scope of the present invention. It is understood, therefore, that this invention is not limited to the particular embodiments disclosed, but it is intended to cover modifications within the spirit and scope of the present invention as defined by the appended claims.

I claim:

1. A steering wheel for steering and braking an vehicle having a steering and braking system, the steering wheel being rotatably mountable about a steering axis in the vehicle, the steering wheel comprising:
   a hub rotatably positionable on the steering axis in operative engagement with the steering system;
   a first steering wheel segment spaced from and rotatably fixed to the hub such that the first steering wheel segment is rotatable, in combination with the hub, about the steering axis to steer the vehicle; and
   a second steering wheel segment spaced from and rotatably fixed to the hub such that the second steering wheel segment is rotatable, in combination with the hub, about the steering axis to steer the vehicle, the second steering wheel segment also being pivotally connected to the hub such that the second steering wheel segment can pivot generally toward the steering axis, the second steering wheel segment being pivotally movable between an equilibrium position in which the second steering wheel segment is aligned with the first steering wheel segment to define at least part of a steering wheel perimeter and a braking position wherein the second steering wheel segment is displaced from alignment with the first steering wheel segment to actuate the braking system.

2. The steering wheel of claim 1 further comprising a third steering wheel segment spaced from and rotatably fixed to the hub such that the third steering wheel segment is rotatable, in combination with the hub, about the steering axis to steer the vehicle, the third steering wheel segment also being pivotally connected to the hub such that the third steering wheel segment can pivot generally toward the steering axis, the third steering wheel segment being pivotally movable between an equilibrium position in which the third steering wheel segment is aligned with the first steering wheel segment to define at least part of the steering wheel perimeter and a braking position wherein the third steering wheel segment is displaced from alignment with the first steering wheel segment to actuate the braking system.

3. The steering wheel of claim 2 wherein the first, second, and third steering wheel segments are each supported by at least one spoke extending from the hub.

4. The steering wheel of claim 2 wherein the second steering wheel segment and he third steering wheel segment are each pivotally mounted to the hub via a pin.

5. The steering wheel of claim 2 wherein the second steering wheel segment and he third steering wheel segment are each biased into the equilibrium position.

6. The steering wheel of claim 2 wherein the second steering wheel segment is capable of actuating a left wheel brake and the third steering wheel segment is capable of actuating a right wheel brake.

7. The steering wheel of claim 1 wherein the first, second and third steering wheel segments define a steering wheel perimeter which has a generally circular shape.

8. An apparatus for steering and braking an vehicle having a steering and braking system, comprising:
   a steering column disposed in the vehicle and positioned along a steering axis;
   a steering wheel disposed on the steering column, the steering wheel comprising:
      a hub disposed on the steering column in operative engagement with the steering system;
      a first steering wheel segment spaced from and rotatably fixed to the hub such that the first steering wheel segment is rotatable, in combination with the hub, about the steering axis to steer the vehicle; and
      a second steering wheel segment spaced from and rotatably fixed to the hub such that the second steering wheel segment is rotatable, in combination with the hub, about the steering axis to steer the vehicle, the second steering wheel segment also being pivotally connected to the hub such that the second steering wheel segment can move generally toward the steering axis, the second steering wheel segment being pivotally movable between an equilibrium position in which the second steering wheel segment is aligned with the first steering wheel segment to define at least part of a steering wheel perimeter and a braking position wherein the second steering wheel segment is displaced from alignment with the first steering wheel segment to actuate the braking system;

at least one cable extending through at least a portion of the steering column and extending at least partially between the braking system and the second steering wheel segment so that the second steering wheel segment is in operative communication with the braking system.

9. The apparatus of claim 8 further comprising a third steering wheel segment spaced from and rotatably fixed to the hub such that the third steering wheel segment is rotatable, in combination with the hub, about the steering axis to steer the vehicle, the third steering wheel segment also being pivotally connected to the hub such that the third steering wheel segment can move generally toward the steering axis, the third steering wheel segment being pivotally movable between an equilibrium position in which the third steering wheel segment is aligned with the first steering wheel segment to define at least part of the steering wheel perimeter and a braking position wherein the third steering wheel segment is displaced from alignment with the first steering wheel segment to actuate the braking system.

10. The apparatus of claim 9 further comprising at least another cable extending through the steering column at least partially between the braking system and the third steering wheel segment so that the third steering wheel segment is in operative communication with the braking system.

\* \* \* \* \*